US012097680B2

(12) United States Patent
Amato

(10) Patent No.: US 12,097,680 B2
(45) Date of Patent: Sep. 24, 2024

(54) INCISION STATION FOR PACKAGING MACHINE AND RELATIVE INCISION METHOD

(71) Applicant: V-SHAPES S.R.L., Calderara di Reno (IT)

(72) Inventor: Rosario Amato, Monte San Pietro (IT)

(73) Assignee: V-SHAPES S.R.L., Calderara Di Reno (IT)

( * ) Notice: Subject to any disclaimer, the term of this patent is extended or adjusted under 35 U.S.C. 154(b) by 1022 days.

(21) Appl. No.: 16/968,400

(22) PCT Filed: Mar. 4, 2019

(86) PCT No.: PCT/IB2019/051718
§ 371 (c)(1),
(2) Date: Aug. 7, 2020

(87) PCT Pub. No.: WO2019/171242
PCT Pub. Date: Sep. 12, 2019

(65) Prior Publication Data
US 2020/0398516 A1 Dec. 24, 2020

(30) Foreign Application Priority Data
Mar. 5, 2018 (IT) ........................ 102018000003287

(51) Int. Cl.
*B31B 70/00* (2017.01)
*B26D 3/08* (2006.01)
(Continued)

(52) U.S. Cl.
CPC ............ *B31B 70/006* (2017.08); *B26D 3/085* (2013.01); *B31B 70/005* (2017.08); *B31B 70/25* (2017.08);
(Continued)

(58) Field of Classification Search
CPC . B26D 3/06; B26D 3/065; B26D 3/08; B26D 3/14; B26D 5/00; B26D 5/06;
(Continued)

(56) References Cited

U.S. PATENT DOCUMENTS 3,039,372 A * 6/1962 La Bombard ............. B31F 1/08 493/396
3,186,283 A * 6/1965 Anderson ............ B26D 1/0006 83/636
(Continued)

FOREIGN PATENT DOCUMENTS

CN 1480304 A 3/2004
CN 102259726 A 11/2011
(Continued)

OTHER PUBLICATIONS

Russian Office Action dated Mar. 14, 2022 from counterpart Russian Patent Application No. 2020129164/05 (0052183).
(Continued)

*Primary Examiner* — Laura M Lee
(74) *Attorney, Agent, or Firm* — SHUTTLEWORTH & INGERSOLL, P.L.C.; Timothy J. Klima

(57) ABSTRACT

An incision station for making a plurality of weaknesses respectively on a plurality of portions of a web, for producing a plurality of packages each of which including a supporting sheet corresponding to a respective portion of the portions and an opening system corresponding to the weakness made on the respective portion. The station includes a plurality of motor driven incision bodies for making incisions in the respective portion to create the weaknesses. The incision bodies are also controlled to obtain a distance needed to contact the respective portion. This invention also relates to a packaging machine which includes the incision
(Continued)

station and a incision method for making the above-mentioned plurality of weaknesses.

9 Claims, 5 Drawing Sheets

(51) Int. Cl.
*B31B 155/00* (2017.01)
*B31B 160/20* (2017.01)
*B65D 75/58* (2006.01)

(52) U.S. Cl.
CPC ....... *B31B 2155/00* (2017.08); *B31B 2160/20* (2017.08); *B65D 75/585* (2013.01)

(58) Field of Classification Search
CPC ....... B26D 5/086; B65B 61/18; B31B 70/006; B31B 70/25; B31B 70/005
USPC ......... 83/881, 688, 883, 696, 862, 865, 692, 83/861, 882, 623, 557, 651; 493/61, 363, 493/366, 473, 51, 861–887, 364
See application file for complete search history.

(56) References Cited

U.S. PATENT DOCUMENTS

| | | | | |
|---|---|---|---|---|
| 3,205,750 A * | 9/1965 | Strange | B26F 1/18 | 83/695 |
| 3,255,648 A * | 6/1966 | Buttery | B26F 1/18 | 83/695 |
| 4,951,967 A * | 8/1990 | Michalik | B26F 1/22 | 83/660 |
| 6,688,198 B2 * | 2/2004 | Matsumoto | B26F 1/44 | 83/139 |
| 8,567,653 B2 * | 10/2013 | Wetsch | B26F 3/002 | 83/835 |
| 2010/0059402 A1 | 3/2010 | Burattini | | |
| 2016/0193798 A1 * | 7/2016 | Ricco' | B65H 23/048 | 493/473 |
| 2020/0398516 A1 * | 12/2020 | Amato | B26D 5/06 | |
| 2023/0012277 A1 * | 1/2023 | Venturini | B26D 1/02 | |
| 2023/0241793 A1 * | 8/2023 | Venturini | B26D 7/2614 | 83/879 |

FOREIGN PATENT DOCUMENTS

| | | | |
|---|---|---|---|
| CN | 202480137 | U | 10/2012 |
| EP | 1903599 | A2 | 3/2008 |
| KR | 960015306 | B1 | 11/1996 |
| RU | 252780 | C2 | 8/2014 |
| RU | 2537830 | C2 | 1/2015 |

OTHER PUBLICATIONS

Indian Search Report dated Jun. 12, 2022 from counterpart Indian Patent Application No. 202017037793.
International Search Report and Written Opinion dated Jun. 25, 2019 from counterpart International Patent Application No. PCT/IB2019/051718.
Chinese Office Action dated May 31, 2021 from counterpart Chinese Patent Application No. 201980017127.5.

* cited by examiner

Fig.6
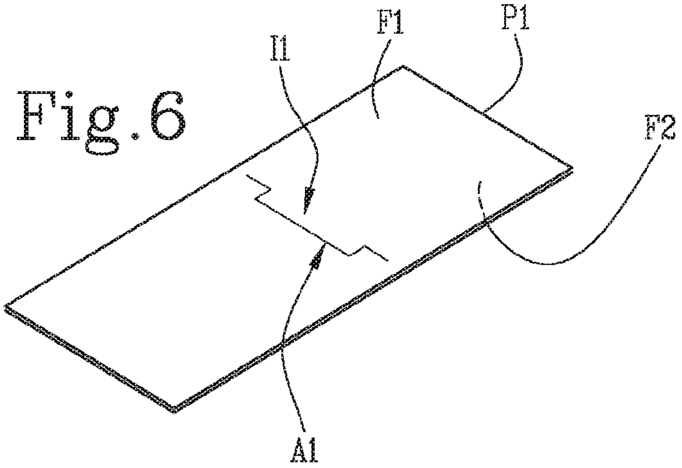
Fig.6A
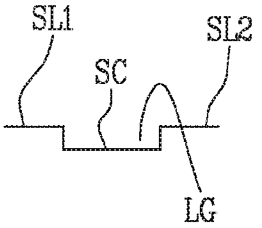
Fig.7
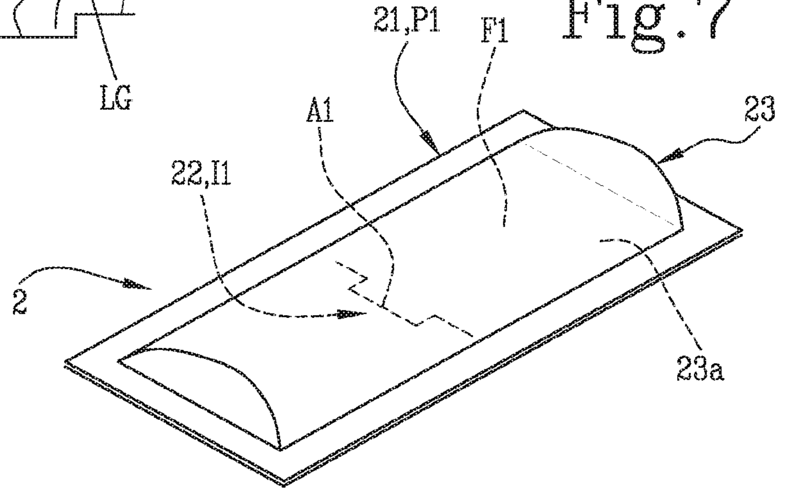
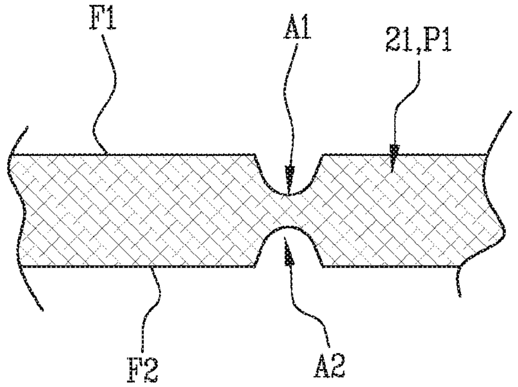
Fig.8

INCISION STATION FOR PACKAGING MACHINE AND RELATIVE INCISION METHOD

This application is the National Phase of International Application PCT/IB2019/051718 filed Mar. 4, 2019 which designated the U.S.

This application claims priority to Italian Patent Application No. 102018000003287 filed Mar. 5, 2018, which application is incorporated by reference herein.

TECHNICAL FIELD

This invention relates to an incision station for making a plurality of weaknesses respectively on a plurality of portions of a web, for producing a plurality of packages each of which comprising a supporting sheet corresponding to a respective portion of the portions and an opening system corresponding to the weakness made on the respective portion, which makes it possible to increase the precision in obtaining the opening system of each package and to increase the productivity of the packaging machine in which the above-mentioned station operates. The invention also relates to a packaging machine which comprises the incision station and an incision method for making the above-mentioned plurality of weaknesses, in such a way as to achieve the above-mentioned aims.

BACKGROUND ART

A type of single-dose package currently exists which comprises a supporting sheet and a closing sheet superposed on and attached to the supporting sheet in such a way as to form a pocket for containing a food product which can be administered through the opening of the package. The opening is achieved by an opening system made on the supporting sheet and comprising a weakness. The weakness is positioned in such a way that the folding of the package along a fold line passing transversely through the weakness can causes the breakage of the weakness, allowing the escape of product from the package. This type of package is designed to contain a single dose of food product, and is therefore a single-dose type of package.

The weakness comprises an inner incision made on a first surface of the supporting sheet, facing towards the pocket, and a outer incision, made on a second surface of the supporting sheet, opposite the first surface and facing the opposite side of the supporting sheet relative to the pocket.

The single-dose package does not allow the product contained in the package to be applied (spread) in an intuitive fashion, so the package is not suitable for containing spreadable products.

In the prior art, patent document US2010/0059402 describes an incision station for making a weakness on a portion of web. In the prior art, patent document EP1903599 describes a method for incision of an adhesive tape.

DISCLOSURE OF THE INVENTION

The aim of the invention is to provide an automatic incision method which can be used in an incision station of a packaging machine for the automatic production of a plurality of packages, each comprising a respective supporting sheet and a respective weakness of the supporting sheet, which ensures that each individual package, by means of the configuration of the weakness, is more suitable, with respect to the prior art, for the application of a spreadable product contained in the package.

Another aim of the invention is to provide an automatic incision method which can be used in the above-mentioned packaging machine which allows a high productivity of the machine to be achieved.

Another aim of the invention is to provide an automatic incision method which can be used in the above-mentioned packaging machine which allows the weakness of each package to be obtained with a high precision.

Another aim of the invention is to provide an automatic incision station configured to automatically perform an incision method which allows the above-mentioned aims to be achieved.

A further aim of the invention is to provide an automatic packaging machine for the automatic production of a plurality of packages, which comprises the incision station configured to automatically perform the incision method, and which is therefore able to achieve the above-mentioned aims relative to the individual package, the productivity of the machine, and the precision in obtaining the weakness.

A further aim of the invention is to provide an automatic packaging method which can be used in the above-mentioned packaging machine, which comprises the above-mentioned incision method and which therefore allows a high productivity of the machine to be achieved.

The above-mentioned aims, with reference to the automatic incision method, are achieved by means of an incision method having the features described in any or any combination of the appended claims and intended to protect the incision method.

The above-mentioned aims, with reference to the automatic packaging method, are achieved by means of a packaging method having the features described in any or any combination of the appended claims and intended to protect the packaging method.

The above-mentioned aims, with reference to the automatic incision station, are achieved by means of an incision station having the features described in any or any combination of the appended claims and intended to protect the incision station.

The above-mentioned aims, with reference to the automatic packaging machine, are achieved by means of a packaging machine having the features described in any or any combination of the appended claims and intended to protect the packaging machine.

According to a first aspect, the invention relates to an automatic incision method. According to a second aspect, the invention relates to an automatic packaging method. An automatic packaging method according to the second aspect comprises the automatic incision method according to the first aspect.

According to a third aspect, this invention relates to an automatic incision station. An incision station according to the third aspect is configured to automatically perform an incision method according to the first aspect of the invention.

According to a fourth aspect, this invention relates to an automatic packaging machine. A packaging machine according to the fourth aspect of the invention comprises an incision station according to the third aspect of the invention, and is configured to automatically perform a packaging method according to the second aspect.

BRIEF DESCRIPTION OF DRAWINGS

The characteristics of an incision method, a packaging method, a incision station and a packaging machine according, respectively, to the first aspect, the second aspect, the third aspect and the fourth aspect, are described in detail below relative to respective possible embodiments of the incision method, the packaging method, the incision station and the packaging machine, given by way of non-limiting examples of the concepts claimed.

The following detailed description refers to the accompanying drawings, in which:

FIG. 6 is a perspective view of a supporting sheet of a package which can be made by a possible embodiment of a packaging method according to the second aspect of the invention;

FIG. 6A is a detailed view of a part of the supporting sheet;

FIG. 7 is a view of a complete the package which can be made by the above-mentioned possible embodiment of the machine;

FIG. 8 is a cross section view of the supporting sheet of FIG. 6, passing through the weakness situated on the supporting sheet.

DETAILED DESCRIPTION OF PREFERRED EMBODIMENTS OF THE INVENTION

Figure 1:
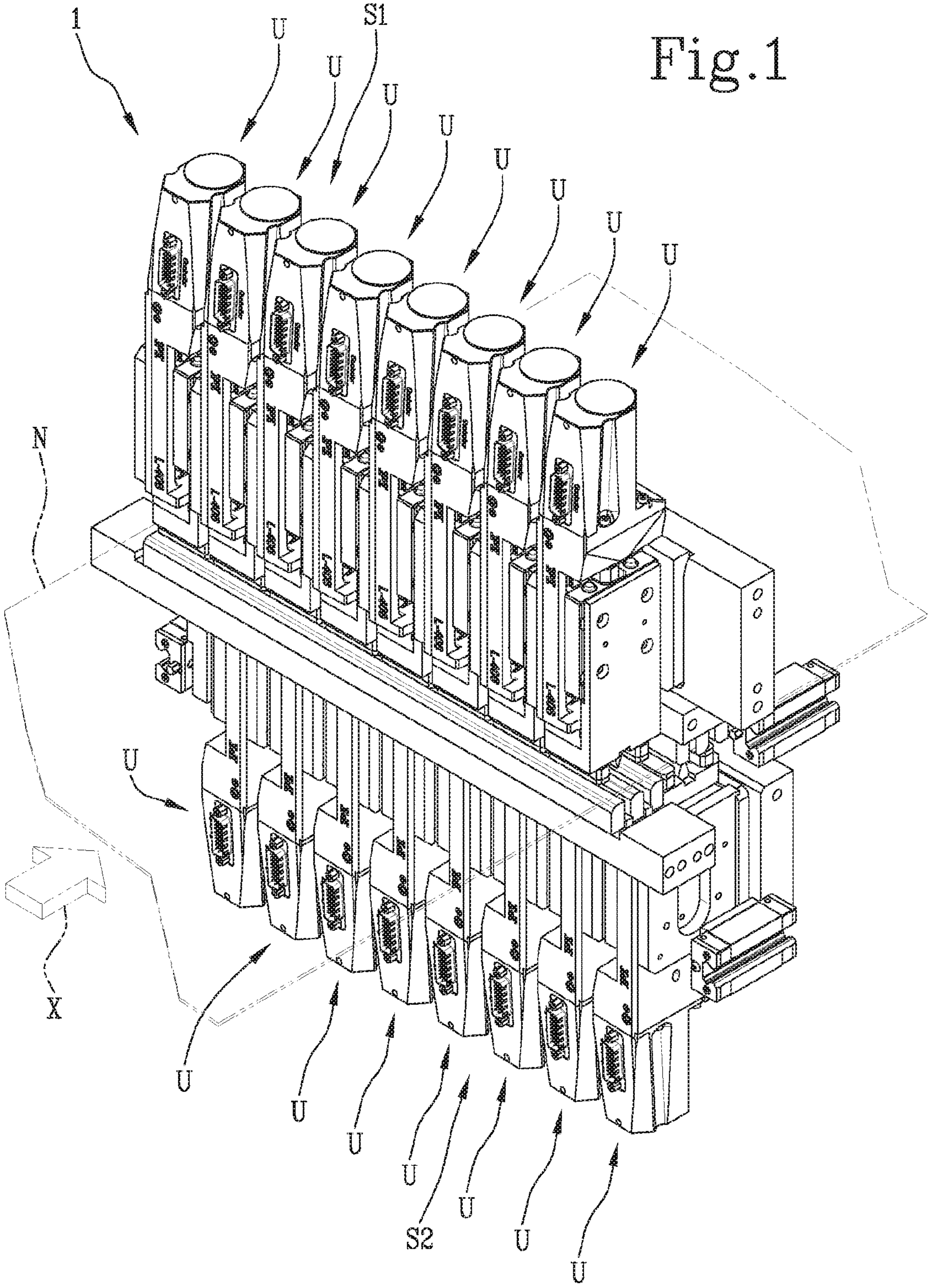
FIG. 1 is a perspective view of a possible embodiment of an incision station according to the third aspect of the invention.

FIG. 1 shows a perspective view, labelled 1, of a possible embodiment of an incision station according to the third aspect of the invention. A possible embodiment of a packaging machine according to the fourth aspect of the invention comprises the incision station 1.

The incision station 1 is configured to automatically perform a possible embodiment of an incision method according to the first aspect of the invention.

A possible embodiment of a packaging method according to the second aspect of the invention comprises the above-mentioned possible embodiment of the incision method.

The above-mentioned possible embodiment of the packaging machine, which comprises the above-mentioned possible embodiment of the incision station, is configured to automatically perform the above-mentioned possible embodiment of the packaging method.

The term "incision method" used below means the possible embodiment of the incision method. The term "packaging method" used below means the possible embodiment of the packaging method. The term "incision station" used below means the possible embodiment of the incision station. The term "packaging machine" used below means the possible embodiment of the packaging machine.

Figure 4:
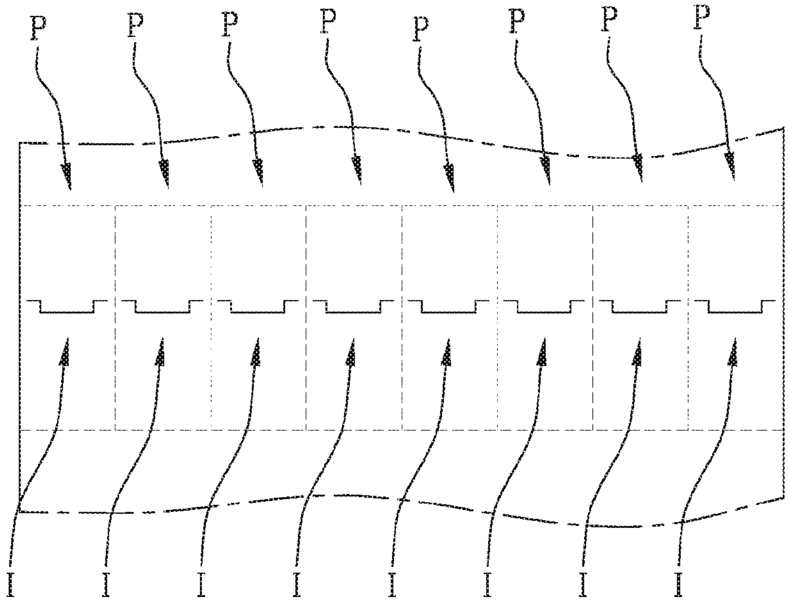
FIG. 4 is a front view of a sector of a web subjected to the incision method.

FIG. 4 shows a plurality of portions of a web. The portions are labelled P in FIG. 4. FIG. 4 shows a plurality of weaknesses I made, by means of the incision method, respectively on the plurality of portions P.

The web is labelled N in FIG. 1 and in FIG. 4. The web N is shown in FIG. 1 in part and as if it were transparent, only for clarity of FIG. 1. FIG. 4 also shows only a part of the web N. The part of the web N shown 5 in FIG. 1 is larger than the part shown in FIG. 4.

The web N could be, for example, made of semi-rigid material.

The first portion P1 referred to below is considered to be any one of the plurality of portions P of the web N. The first weakness I1 referred to below is considered to be the weakness made on the first portion P1. Each weakness I of the plurality of weaknesses I may have one or more of the features of the first weakness I1. Each portion P of the plurality of portions P can have one or more of the features of the first portion P1.

FIG. 6 is a perspective view of the first portion P1. FIG. 8 shows a transversal cross-section passing transversely through the first weakness I1. FIGS. 3A-3D show different successive steps of a first operating sequence, performed on the first portion P1, for making an incision which forms part of the first weakness I1.

The first portion P1 has a first face F1 and a second face F2. The second face F2 is opposite the first face F1. The first face F1 and second face F2 are shown in FIGS. 3A, 6, 7 and 8.

The first weakness I1 comprises a first incision A1 located and/or made and/or formed on the first face F1. The first weakness I1 comprises a second incision A2 located and/or made and/or formed on the second face F2. The second incision A2 could be aligned with the first incision A1. The 2 5 second incision A2 might not be aligned with the first incision A1.

The terms "first incision" or "second incision" are used to mean a modification made in the structure of the first portion P1. This modification is designed to weaken the first portion P1. At a local level, the first or second incision could be obtained by means of a cut and/or by removing material. The incision could be obtained, alternatively, by flattening the material and/or movement of the material, even without that being a proper cut.

Therefore, in this invention, the term 'incision' could either mean 'cut' or 'flattening'.

The term "weakness" means an area of weakness of the first portion P1. The weakened zone comprises the first incision A1 and the second incision A2.

The first incision A1 is positioned along an incision line. The incision line comprises a U-shaped central sector and two lateral sectors located on mutually opposite sides of the central sector SC. An example of the incision line is shown in FIG. 6A. In FIG. 6A the central sector is labelled SC and the lateral sectors are labelled, respectively, SL1 and SL2. The geometrical configuration of the incision line is made in such a way that the central sector SC defines a tab LG situated between the lateral sectors SL1, SL2. The second incision A2 can have one or more of the features of the first incision A1. The second incision is preferably equal to the first incision A1. The incision method is for automatically making at least the first weakness I1 on the first portion P1.

The incision method comprises a movement step, during which is caused a movement of the web N which comprises the first portion P1. This movement of the web N comprises at least one component along a direction of movement. The direction of movement is indicated by the arrow X shown in FIGS. 1 and 2.

The incision method comprises, for the first portion P1, a first operating sequence associated with the first portion P1. The first operating sequence is for making the first incision A1.

The movement of the web N is caused in such a way that, thanks to this movement, the first portion P1 is adequately positioned so that the first operating sequence associated with the first portion P1 can be performed. The first operating sequence comprises an obtaining step and an incision step.

During the incision step, the first incision A1 is defined and/or formed. The incision step is performed by an incision movement of an incision body. The incision movement is imparted by a motor. The incision movement has at least one component along a incision direction. The incision direction is transversal to the first face F1 of the first portion P1. The incision direction could be at right angles to the first face F1 of the first portion P1.

Figures 2, 2A:
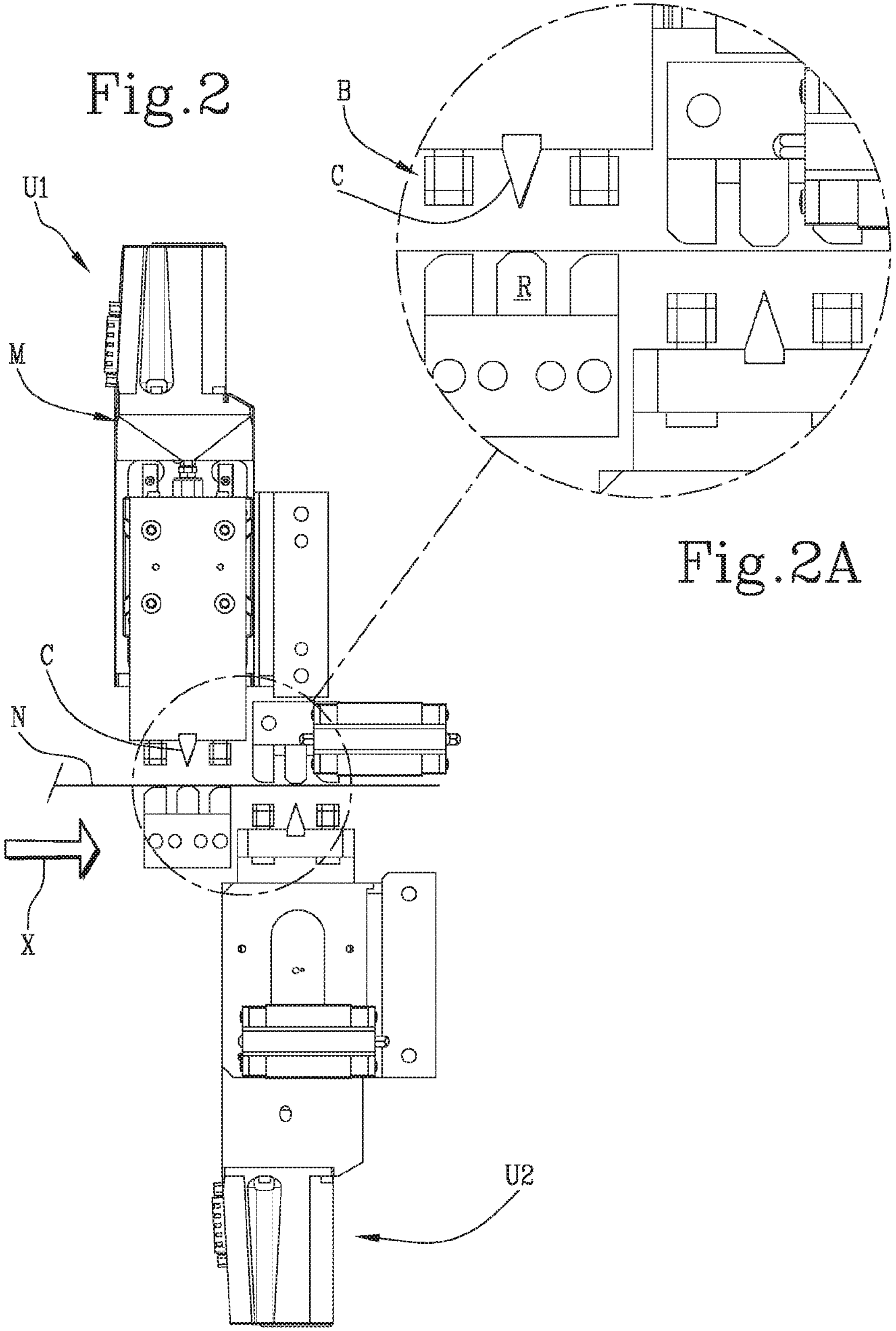
FIG. 2 is a side view of an incision unit belonging to a first incision substation belonging in turn to the embodiment of the incision station, and an incision unit belonging to a second incision substation belonging in turn to the same embodiment of the incision station.
FIG. 2A is an enlargement of a part of FIG. 2.

An example of the motor is labelled M in FIGS. 1 and 2. The motor M could be an electric motor. The motor could be a linear or rotary electric motor. The motor could be, for example, a synchronous and/or brushless motor. An example of the incision body is labelled C in FIGS. 2, 2A, 3A-3D and 5.

Figure 5:
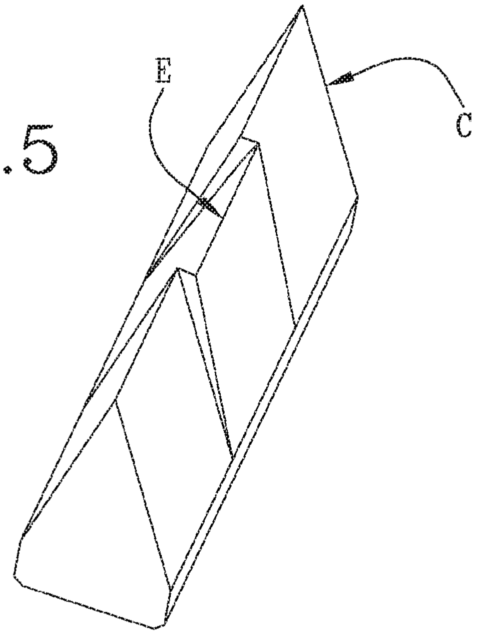
FIG. 5 is a perspective view of an incision body belonging to any incision unit of one of the incision substations.

The incision body C comprises an incision element E that is shaped so that the first incision A1 is positioned along the incision line described above. The incision element E may be, for example, a flattening element or a blade. An example of the incision body C is shown in FIG. 5. The incision movement, in the example shown in the accompanying drawings, occurs between FIG. 3C and FIG. 3D.

The incision movement, and therefore the incision step, is performed in opposition to a contact element R situated on the opposite side of the first portion P1 relative to the incision body C. The incision step is performed whilst the first portion P1 is locked by means of a locking system B. The incision movement comprises, along the incision direction, a first movement of the incision body C. The first movement covers, along the incision direction, a first distance D, so that the incision body C contacts the first portion P1. The first distance D, in the example shown in the accompanying drawings, is indicated in FIG. 3C.

The incision movement comprises, along the incision direction, a second movement of the incision body C. The second movement covers, along the incision direction, a second distance d, so that the incision body C makes and/or forms the first incision A1. The second distance d is the depth of the first incision A1. The second distance d, in the example shown in the accompanying drawings, is indicated in FIG. 3D. Consequently, the incision movement covers, along the incision direction, an overall distance given by the sum of the first distance D and the second distance d. The first distance D is the distance sufficient so that the incision body C contacts the first portion P1. The second distance d is the distance sufficient to obtain a first incision A1 having a depth equal to the second distance d.

During the obtaining step, the current value of the first distance D is obtained.

The obtaining step is performed before the incision step. The obtaining step occurs by means of a detection movement of the incision body C. The obtaining step is performed by detecting a contact between the incision body C and the first portion P1. This contact occurs during the detection movement. During the detection movement, the incision body C comes into contact with the first portion P1 and a contact sensor detects the contact between the incision body C and the first portion P1. The detection movement is imparted by the motor M. The detection movement has at least one component along the incision direction. This contact sensor could be a sensor designed to detect the resistant torque which acts on the motor M.

Figure 3A:
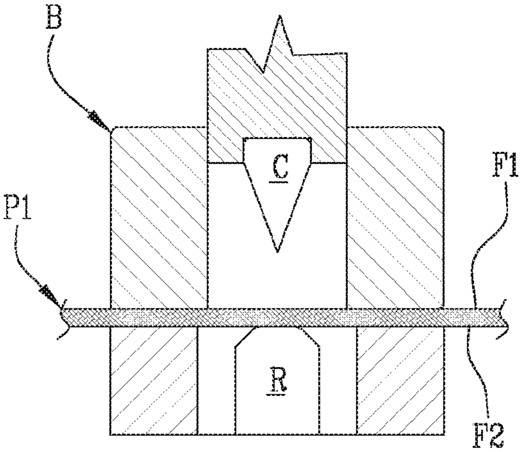
FIGS. 3A-3D are schematic views of respective parts of an operating sequence of a possible embodiment of an incision method according to the first aspect of the invention.
Figure 3B:
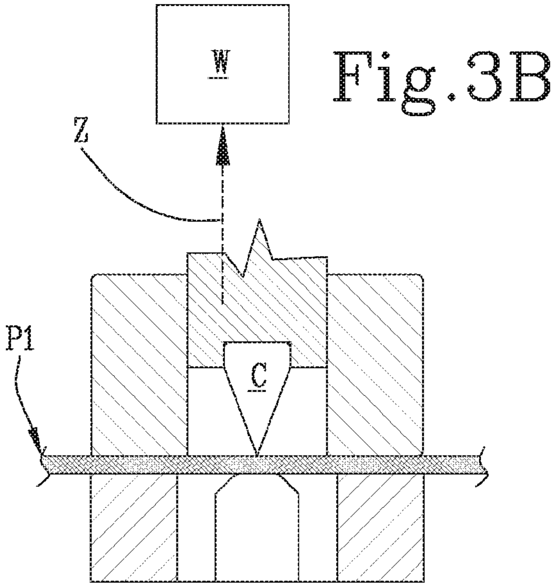
Figure 3C:
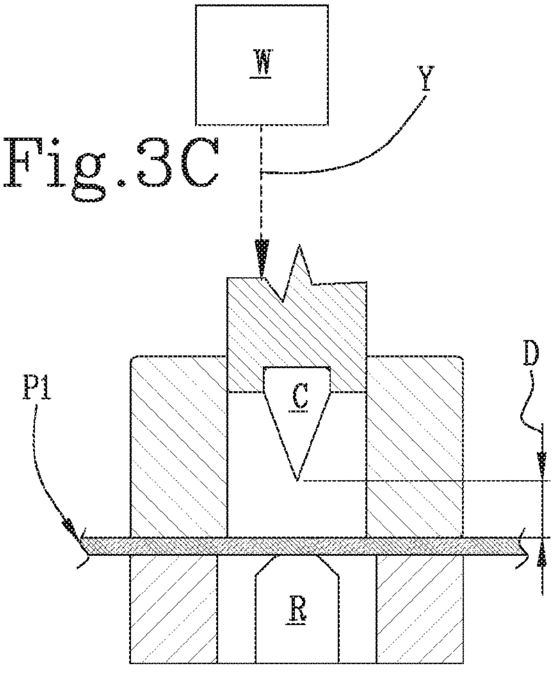
Figure 3D:
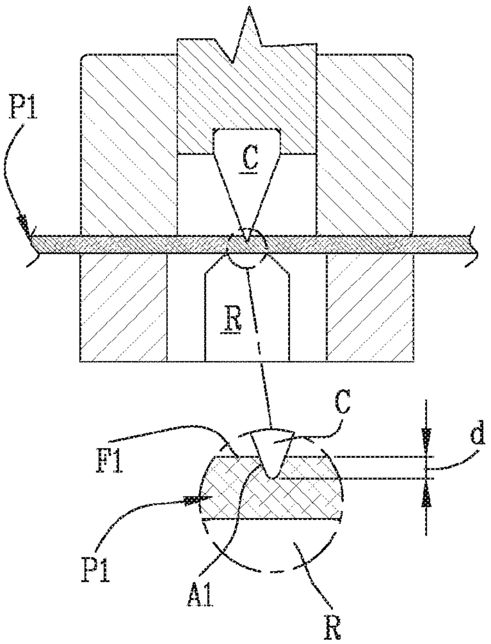

The detection movement, in the example shown in the accompanying drawings, occurs between FIG. 3A and FIG. 3B.

The contact between the incision body C and the first portion P1, during the detection movement, could be performed in opposition to the contact element R. The obtaining step is performed whilst the first portion P1 is locked by means of the locking system B.

By means of the obtaining step, the subsequent incision step may be very precise because the first distance D that is used to come into contact with the portion P is known. Moreover, this information is particularly useful if the motor M is an electric motor which can precisely adjust the position of the incision body 22 during the incision movement.

The first weakness I1 comprises the first incision A1.

The incision method comprises a first control step during which the first operating sequence is automatically controlled. The first control step is therefore performed during the first operating sequence.

The incision station 1 comprises a first incision substation S1. The first incision substation S1 is configured to perform the first operating sequence. In order to perform the first operating sequence, the first incision substation S1 comprises a first incision unit U1. An example of the first incision unit U1 is shown in FIG. 2. The first incision unit U1 comprises the motor M. The first incision unit U1 comprises the incision body C. The first incision unit U1 comprises the contact sensor. The first incision unit U1 comprises the contact element R. The first incision unit U1 comprises the locking system B.

The contact sensor could be configured to detect the contact between the incision body C and the first portion P1, without physically contacting the first portion P1, but deriving the fact that contact has occurred through the resistant torque acting on the motor M. The contact sensor could be, for example, configured to derive the resistant torque from at least one kinematic data relating to the motor. The at least one kinematic data could be, for example, either the speed or the angular acceleration of a shaft of the motor. For this reason, the contact sensor could comprise an encoder. The incision unit U could comprise at least one intermediate element interposed between the motor M and the incision body C, so that the motor M can cause the incision movement and/or the detection movement. The at least one intermediate component could for example comprise a screw. The at least one intermediate component could comprise a slide on which the incision body C is mounted. The incision unit U could be configured so that a rotational movement of the screw, imparted by the motor M, causes a translation of the slide, in such a way that the translation of the slide corresponds to the translation of the incision body C, and/or in general to the component along the incision direction of the incision movement and/or the detection movement of the incision body C. The incision station 1 comprises a movement system configured to cause the above-mentioned movement of the web N.

This movement of the web N is designed to ensure that the first incision unit U1 receives the first portion P1 in such a way as to perform the first operating sequence.

The incision station 1 comprises a control system. The control system is configured to control the first incision unit U1, in such a way as to perform the above-mentioned first control step.

The control system comprises at least one control unit. The control unit is represented by the block W in FIGS. 3B and 3C.

The arrow Z in FIG. 3B indicates a detection signal sent by the contact sensor to the control unit W. The detection signal Z indicates the detection of the contact between the incision body C and the first portion P1. The arrow Y in FIG. 3C indicates a control signal sent by the control unit W to the motor M. The control signal Y is a function at least of the value obtained of the first distance D, which in turn is obtained from the above-mentioned detection signal Z. The control signal Y is such that the overall distance which is covered by the incision body C, during the incision movement, and along the incision direction, is equal to the sum of the first distance D and the second distance d. Using the control signal Y, the control unit W therefore controls the motor of the incision unit U1, as a function of the value obtained of the first distance D. The control unit W is able to control the motor M of the incision unit U in such a way that the depth of the first incision A1, which is equal to the second distance d, is obtained with an excellent precision, since the control unit W, thanks to the previous obtaining step, knows with an excellent precision the first distance D, which is the distance necessary to come into contact with the first portion P1. In fact, what is not known before the incision step is the first distance D, which could vary, from one portion P to the other, depending on how the sector of the web N which comprises the portions P is positioned. The second distance d is, on the other hand, known, since it is the desired depth of the first incision A1.

Between the obtaining step and the incision step, the incision body C is returned to the starting position to be able to have a sufficient impact energy, during the incision movement, to give rise to the first incision A1. The packaging method is for the automatic production of at least a first package. The first package is labelled 2 in FIG. 7. The packaging method comprises the incision method.

The packaging method is performed in such a way that the first package 2 comprises a supporting sheet 21 corresponding to the first portion P1. The packaging method is performed in such a way that the first package 2 comprises an opening system 22. The opening system 22 corresponds to the first weakness I1.

More specifically, if the supporting sheet 21, and thus the first portion P1, are made of semi-rigid material, the geometrical configuration of the incision line is such that the first weakness I1 can guide the failure of the supporting sheet 21, in such a way as to create an opening for taking out the product which is particularly suitable for spreading the product. The tab LG defined by the central sector SC, when the first weakness I1 is broken, lends itself to escape of a spreadable product and may be useful for spreading the product. This renders the first package 2 suitable for being a package for containing a spreadable product. The first package 2 comprises a sealing sheet 23 superposed on and attached to the supporting sheet 21 in such a way as to form a pocket 23*a* situated between the supporting sheet 21 and the sealing sheet 23. The pocket 23*a* is for containing a food product which may be administered through the opening of the package 2.

The first package 2 could be a single-dose package.

The sealing sheet 23 could be sealed to the supporting sheet 21.

In order to open the first package 2 the user can grip the first package 2 and bend it into a 'v' until breaking the supporting sheet 21 at the first weakness I1.

The incision method is for automatically making the weaknesses I on the respective portions P of the plurality of portions P.

The portions P of the plurality of portions are distributed on a sector of the web N along a direction of distribution transversal to the direction of movement X. The direction of distribution could be at right angles to the direction of movement X.

The incision method could comprise, for each portion P of the plurality of portions P, a respective first operating sequence associated with the respective portion P. The respective first operating sequence associated with the respective portion P may have one or more of the features of the first operating sequence associated with the first portion P1. The movement of the web N is caused in such a way that, thanks to this movement, and for each portion P, the respective portion P is adequately positioned in order to perform the respective first operating sequence associated with the same respective portion P. During the first control step, each first operating sequence associated with a respective portion P is automatically controlled independently from the other first operating sequences associated with the other portions P.

The first control step is performed therefore during the first operating sequences associated with the respective portions P. The first incision substation S1 is configured to perform, for each portion P of the plurality of portions P, the first operating sequence associated with the respective portion P. The first incision substation S1 comprises a plurality of incision units U. Each incision unit U performs an operating sequence associated with a respective portion P. Each incision unit U may have one or more of the features of the first incision unit U1.

This movement of the web N is designed to ensure that each incision unit U of the first substation S1 receives a respective portion P in such a way as to perform the respective first operating sequence associated with the respective portion P received.

The control system is configured for controlling each incision unit U of the first substation S1, independently from the other incision units U of the first substation S1, in such a way as to perform the above-mentioned first control step.

The control system is configured for automatically controlling each incision unit U of the first substation S1 independently from the other incision units U of the first substation S1 in such a way as to automatically control each first operating sequence associated with a portion P independently from the other first operating sequences associated with the other portions P, in such a way as to perform the first control step.

For this reason, during the first control step, the incision movement of each incision body of the first substation S1 is therefore controlled automatically independently from the incision movements of the other incision bodies of the first substation S1.

The control system is configured for automatically controlling the obtaining step of each first operating sequence associated with a portion P independently from the obtaining steps of the other first operating sequences associated with the other portions P.

For this reason, during the first control step, the step of obtaining the value of the first distance of each incision movement of a respective incision body of the first substation S1 is controlled automatically independently of the steps of obtaining the first distance of the other incision movements the other incision bodies of the first substation S1.

In this way, even if the web N has variations of positioning along the row of portions P of the sector of the web N, each first incision may be obtained with an excellent precision, since for each incision unit of the first substation S1 the value of the first distance needed to come into contact with the respective portion is measured.

The packaging method is for the automatic production of a plurality of packages.

The packaging method is performed in such a way that each package comprises a supporting sheet corresponding to a respective portion P of the plurality of portions P.

The packaging method is performed in such a way that each package comprises a respective opening system. The respective opening system corresponds to the weakness I made on the respective portion P.

Each of the packages may have one or more of the features of the first package 2.

The incision method comprises, for the first portion P1, a second operating sequence associated with the first portion P1. The second operating sequence is for making the second incision A2 of the first weakness I1. The second operating sequence associated with the first portion P1 may have one or more of the features of the first operating sequence associated with the first portion P1.

The movement of the web N is caused in such a way that, thanks to this movement, the first portion P1 is adequately positioned so that the second operating sequence associated with the first portion P1 can be performed. The second operating sequence could be performed after the first operating sequence associated with the first portion P1 or at least partly simultaneously with it.

The first weakness I1 comprises the second incision A2.

The incision method comprises a second control step during which the second operating sequence is automatically controlled.

The second control step is therefore performed during the second operating sequence.

The incision station 1 comprises a second incision substation S2. The second incision substation S2 is configured to perform the second operating sequence. In order too perform the second operating sequence, the second incision substation S2 comprises a second incision unit U2. An example of the second incision unit U2 is shown in FIG. 2. The second incision unit U2 may have one or more of the features of the first incision unit U1.

This movement of the web N is designed to ensure that the second incision unit U2 receives the first portion P1 in such a way as to perform the second operating sequence.

The control system is configured to control the second incision unit U2, in such a way as to perform the above-mentioned second control step. The incision method could comprise, for each portion P of the plurality of portions P, a respective second operating sequence associated with the respective portion P. The respective second operating sequence associated with the respective portion P may have one or more of the features of the second operating sequence associated with the first portion P1.

For each portion P, the second operating sequence associated with the respective portion P could be performed after the first operating sequence associated with the same respective portion P or at least partly simultaneously with it.

The movement of the web N is caused in such a way that, thanks to this movement, and for each portion P, the respective portion P is adequately positioned in order to perform the respective second operating sequence associated with the same respective portion P.

During the second control step, each second operating sequence associated with a respective portion P is automatically controlled independently from the other second operating sequences associated with the other portions P.

The method comprises a second control step during which each second operating sequence associated with a respective portion P is automatically controlled independently from the other second operating sequences associated with the other portions.

The second control step is therefore performed during the second operating sequences associated with the respective portions P.

The second incision substation S2 is configured to perform, for each portion P of the plurality of portions P, the second operating sequence associated with the respective portion P. The second incision substation S2 comprises a plurality of incision units U. Each incision unit U of the second substation S2 is configured to perform a second operating sequence associated with a respective portion P. Each incision unit U of the second substation S2 may have one or more of the features of the second incision unit U2.

This movement of the web N is designed to ensure that each incision unit U of the second substation S2 receives a respective portion P in such a way as to perform the respective second operating sequence associated with the respective portion P received.

The control system is configured for controlling each incision unit U of the second substation S2, independently from the other incision units U of the second substation S2, in such a way as to perform the above-mentioned second control step.

The control system is configured for automatically controlling each incision unit U of the second substation S2 independently from the other incision units U of the second substation S2 in such a way as to automatically control each second operating sequence associated with a portion P independently from the other second operating sequences associated with the other portions P, in such a way as to perform the second control step. For this reason, during the second control step, the incision movement of each incision body of the second substation S2 is therefore controlled automatically independently from the incision movements of the other incision bodies of the second substation S2.

The control system is therefore configured for automatically controlling the obtaining step of each second operating sequence associated with a portion P independently from the obtaining steps of the other second operating sequences associated with the other portions P.

For this reason, during the second control step, the step of obtaining the value of the first distance of each incision movement of a respective incision body of the second substation S2 is controlled automatically independently of the steps of obtaining the first distance of the other incision movements the other incision bodies of the second substation S2. In this way, even if the web N has variations of positioning along the row of portions P of the sector of the web N, each second incision may be obtained with an excellent precision, since for each incision unit the value of the first distance needed to come into contact with the respective portion is measured.

If, for each portion P, the respective first operating sequence and the respective second sequence associated with the respective portion P occur at least partly or completely simultaneously, the first substation S1 and the second substation S2 could be joined in a single station.

In the example according to the accompanying drawings, the second operating sequence associated with each portion P occurs after the first operating sequence associated with the same portion P, and the second substation S2 is separated from the first substation S1.

The invention claimed is:

1. An automatic incision station for making a plurality of weaknesses on a plurality of respective portions of web, comprising:

each of the portions having a respective first face and a respective second face opposite to the respective first face;

each of the weaknesses comprising a respective first incision located on the respective first face of a respective portion and a respective second incision located on the respective second face of the same respective portion;

an incision substation configured to perform a plurality of operating sequences, each operating sequence associated with a respective portion and comprising a respective incision step which defines the respective first or the respective second incision of the weakness to be made on the respective portion;

a control system configured for automatically controlling the incision substation to automatically control each operating sequence independently from the other operating sequences;

a plurality of incision units, each configured for performing a respective operating sequence;

each of the incision units comprising a respective incision body and a respective motor and being configured so that the respective motor imparts a respective incision movement to the incision body, to perform the incision step;

the control system being configured for automatically controlling each incision unit of the incision substation independently from the other incision units to automatically control each operating sequence independently from the other operating sequences;

the incision movement comprising, along a respective incision direction transversal to the respective portion:

a respective first movement of the incision body for a respective first distance along the respective incision direction so that the incision body makes contact with the respective portion;

a respective second movement of the incision body for a respective second distance along the respective incision direction so that the incision body makes the respective incision, the respective second distance being a depth of the respective incision;

each operating sequence comprising a respective obtaining step occurring prior to the respective second movement, where a value of the respective first distance of the respective incision movement is automatically obtained;

the control system being configured for automatically controlling each incision unit of the incision substation independently from the other incision units to automatically control the obtaining step of each operating sequence independently from the obtaining steps of the other operating sequences.

2. The incision station according to claim 1, wherein the motor of each incision unit is an electric motor.

3. The incision station according to claim 1, wherein each incision unit comprises a respective contact sensor configured to perform at least a portion of the respective obtaining step by using the respective motor to impart to the respective incision body prior to the respective second movement a respective detection movement to bring the incision body into contact with the respective portion;

the respective contact sensor detecting, during the respective detection movement, the contact between the incision body and the respective portion.

4. The incision station according to claim 3, wherein the contact sensor of each incision unit is a sensor configured to detect a resistant torque acting on the respective motor.

5. The incision station according to claim 1, wherein the incision body of each incision unit comprises an incision element shaped such that the respective first incision is positioned along a respective incision line, the respective incision element comprising a central U-shaped sector and two lateral sectors positioned on mutually opposite sides of the central U-shaped sector, such that the central U-shaped sector defines a tab situated between the two lateral sectors.

6. An automatic packaging machine comprising the incision station according to claim 1 and configured for producing a plurality of packages, each of the packages comprising:

a supporting sheet corresponding to a respective one of the portions;

an opening system corresponding to the weakness made in the respective one of the portions.

7. An automatic incision method for making a plurality of weaknesses on a plurality of respective portions of web, comprising:

providing that each of the portions has a respective first face and a respective second face opposite to the respective first face;

providing that each of the weaknesses comprises a respective first incision located on the respective first face of a respective portion and a respective second incision located on the respective second face of the respective portion;

a plurality of operating sequences, each of the operating sequences associated with a respective portion and comprising a respective incision step which defines the respective first or the respective second incision of the weakness to be made on the respective portion;

a controlling step where each of the operating sequences is controlled automatically independently from the other operating sequences;

for each operating sequence, the respective incision step being performed by a respective incision movement of a respective incision body, the respective incision movement being imparted by a respective motor;

during the controlling step, the incision movement of each incision body being controlled automatically independently from the incision movements of the other incision bodies;

the incision movement comprising, along a respective incision direction transversal to the respective portion:

a respective first movement of the incision body for a respective first distance along the respective incision direction so that the incision body makes contact with the respective portion;

a respective second movement of the incision body for a respective second distance along the incision direction so that the incision body makes the respective incision, the respective second distance being a depth of the respective incision;

each operating sequence comprising a respective obtaining step occurring prior to the respective second movement, where a value of the respective first distance of the respective incision movement is automatically obtained;

during the controlling step, the step of obtaining the value of the first distance of each incision movement is controlled automatically irrespective of the steps of obtaining the first distance of the other incision movements.

8. The incision method according to claim 7, and further comprising performing at least a portion of the respective obtaining step by using the respective motor to impart to the respective incision body prior to the respective second movement a respective detection movement to bring the incision body into contact with the respective portion and using a respective contact sensor to detect the contact between the respective incision body and the respective portion.

9. An automatic packaging method for the production of a plurality of packages, comprising:

the incision method according to claim 7;

providing that each package comprises: a respective supporting sheet corresponding to a respective portion of the portions of web;

providing an opening system corresponding to the weakness made in the respective portion.

* * * * *